United States Patent
Halpin et al.

(10) Patent No.: US 11,961,143 B2
(45) Date of Patent: Apr. 16, 2024

(54) METHOD AND APPARATUS FOR FACILITATING MERCHANT SELF SERVICE WITH RESPECT TO FINANCING AND CONTENT SUPPORT FOR MARKETING EVENTS

(71) Applicant: Affirm, Inc., San Francisco, CA (US)

(72) Inventors: Donovan Halpin, San Francisco, CA (US); Jesse Kendrick, San Francisco, CA (US); Julia Harrigan, San Francisco, CA (US); Daniel E. Kaufman, San Francisco, CA (US); Nitesh Kumar, San Francisco, CA (US)

(73) Assignee: Affirm, Inc., San Francisco, CA (US)

( * ) Notice: Subject to any disclaimer, the term of this patent is extended or adjusted under 35 U.S.C. 154(b) by 0 days.

(21) Appl. No.: 17/851,146

(22) Filed: Jun. 28, 2022

(65) Prior Publication Data
US 2023/0419409 A1     Dec. 28, 2023

(51) Int. Cl.
| | |
|---|---|
| *G06Q 30/02* | (2023.01) |
| *G06Q 30/0203* | (2023.01) |
| *G06Q 40/04* | (2012.01) |
| *G06Q 40/06* | (2012.01) |

(52) U.S. Cl.
CPC ......... *G06Q 40/06* (2013.01); *G06Q 30/0203* (2013.01); *G06Q 40/04* (2013.01)

(58) Field of Classification Search
CPC ..... G06Q 40/06; G06Q 30/0203; G06Q 40/04
See application file for complete search history.

(56) References Cited

U.S. PATENT DOCUMENTS

| | | | |
|---|---|---|---|
| 2007/0083459 A1* | 4/2007 | Eubanks | G06Q 30/06 705/38 |
| 2009/0138338 A1 | 5/2009 | Moukas et al. | |
| 2014/0143127 A1* | 5/2014 | Hammock | G06Q 40/03 705/38 |
| 2016/0232560 A1* | 8/2016 | VanDeVelde | G06Q 30/0238 |
| 2017/0161783 A1* | 6/2017 | Nair | G06Q 30/0255 |
| 2017/0308926 A1* | 10/2017 | Wofford | G06Q 20/40 |
| 2018/0365739 A1 | 12/2018 | Koshy et al. | |

(Continued)

OTHER PUBLICATIONS

"Affirm Marketing App"—(Description of the Affirm Marketing App published online at https://www.bigcommerce.com/apps/affirm/ on Apr. 15, 2021—screen capture retrieved using Internet Archive Wayback Machine on Feb. 1, 2023) (Year: 2021).*

(Continued)

*Primary Examiner* — James M Detweiler
(74) *Attorney, Agent, or Firm* — Burr & Forman LLP

(57) ABSTRACT

A method of facilitating merchant self-service assistance to financing and content support for a marketing event may include receiving a request from a merchant for approval for financing and content generation to support the marketing event and determining whether to approve the merchant based on comparing information provided in the request to approval standards. The method may further include, responsive to approval of the merchant, receiving context information regarding content requested, and providing the content requested to the merchant based on the context information to support the marketing event.

18 Claims, 5 Drawing Sheets

(56) References Cited

U.S. PATENT DOCUMENTS

| | | | |
|---|---|---|---|
| 2019/0019213 A1* | 1/2019 | Silberman | G06Q 30/0244 |
| 2019/0318393 A1 | 10/2019 | Wicha et al. | |
| 2020/0051117 A1* | 2/2020 | Mitchell | G06Q 30/0239 |
| 2022/0101427 A1* | 3/2022 | Zalik | G06Q 40/03 |

OTHER PUBLICATIONS

"Merchant Marketing Guidelines" (Published by Affirm and available on Nov. 30, 2018 at https://cdn-assets.affirm.com/docs/pdf/MerchantMarketingGuidelines_11.30.2018.pdf ) (Year: 2018).*

Affirm pay-over-time messaging app (published on shopify.com on Apr. 13, 2021 athttps://apps.shopify.com/affirm and captured using internet archive wayback machine on Feb. 1, 2023) (Year: 2021).*

"Underwriting Basics: How we evaluate and approve retail partners" (Vijay, Swati; published Apr. 18, 2019 at https://www.affirm.com/business/blog/underwriting-basics-how-we-evaluate-and-approve-retail-partners) (Year: 2019).*

Extended European Search Report from corresponding European Application No. 23179762.2 dated Jul. 10, 2023, all pages cited in its entirety.

\* cited by examiner

Request terms:

What type of event are you inquiring about? — 310
- Financing promo — 312
- Sale — 314

What are the proposed dates for your event? — 320

What type of financing do you plan to offer? — 330
- BNPL
- Fixed Interest Loan

What are your service bid? — 340
USD

What are your pricing constraints?

Interest Rate — 350
0%    7%    20%

Max Finance amount — 352
$0    $3500    $5,000

Min Finance amount — 354
$0 $50    $5,000

What are the products/SKUs featured in your event? — 360

FIG. 3.

Congratulations!!
Your approved. Now let us help you generate content for integration into your sale.

Where would you like to include notice of your sale?
- ○ Website front page
- ○ Product page ← 410
- ○ Checkout page What is your preferred format for notice of your sale?
- ○ Banner
  - [Location ▼]   ← 420
- ○ Pop-up
  - [Location ▼]
  - [Timing ▼]
- ○ Custom
  - [Form ▼]
  - [Location ▼]
  - [Timing ▼]

Please upload any logos or other branding features/taglines you would like to include in your content
- [Logo ▼]
- [Tagline ▼]   ← 430
- [Other ▼]

Tell us about your web architecture, so we can provide content right for you
- [▼]   ← 440

- ○ Please contact our staff to integrate   ← 450
  - [Contact Info]

FIG. 4.

METHOD AND APPARATUS FOR FACILITATING MERCHANT SELF SERVICE WITH RESPECT TO FINANCING AND CONTENT SUPPORT FOR MARKETING EVENTS

TECHNICAL FIELD

Example embodiments generally relate to financial industry technologies and, in particular, relate to apparatuses, systems, and methods for facilitating commerce by enabling merchants that are members of an ecosystem or platform via which customer financing and payment options are handled, to access resources for extending financing options to customers in a self-service environment.

BACKGROUND

The financial industry is comprised of many thousands of customers, vendors, lenders, borrowers, and other bit players that all interact in various ways to enable customers to ultimately have access to goods and services provided by vendors. Credit and debit transactions have long been a way that individuals have managed point of sale transactions to ensure seamless transfer of funds from customers, or on their behalf, to vendors for relatively routine or small transactions. Meanwhile, obtaining a loan from a bank has long been the most common way of obtaining financing for non-routine or larger transactions.

In each of the cases above, a relatively rigid and pre-planned sequence of activities occurs before, during, and after the transaction is closed. The customer makes the decision up front as to which mechanism to employ, and the handling of the entire transaction after that initial decision is made follows existing and well-known paths to completion. While there is great flexibility in that many options are available to customers (particularly those with good credit), the flexibility can be somewhat illusory in situations in which merchants do not accept a certain payment method.

Merchant acceptance of payment methods may, in some cases, be a function of the costs to the merchant for accepting each payment method. If the merchant has to pay to access processing services for a given payment method, the merchant may decide to forgo the opportunity based on cost. However, in order to improve access to customers, many merchants may nevertheless be willing to take positive steps to apply for participation in a particular payment platform and/or may have to obtain specific equipment. Once integrated into the platform, or ecosystem supported by the platform, the merchant may wish to run adds, sales, or engage in other marketing activities that may leverage the financing options provided by the platform. In a typical case, the merchant may have to expend yet further time and energy interacting with personnel associated with the platform to determine what products or terms can be offered to customers, and to create the content that is to be provided to the customers as well. This takes time, and uses resources, at both the merchant's end and for the platform.

Example embodiments are aimed at reducing the transactional friction described above by creating a technical platform that uses intelligent technical means by which to not only make it easier for the merchant to craft content, but also do so using relatively automated tools that expedite processing at the merchant's end, and also minimize the resources needed at the platform end as well.

BRIEF SUMMARY OF SOME EXAMPLES

Accordingly, some example embodiments may enable the provision of technical means by which to give a facilitator of loans the ability to enable merchants to integrate into an ecosystem for supporting commerce between members (e.g., customers, merchants and lenders) of the ecosystem, and then access technical tools that are able to quickly and easily customize content that the merchant is approved for offering to customers in a self-service environment.

In an example embodiment, a method of facilitating merchant self-service assistance to financing and content support for a marketing event may be provided. The method may include receiving a request from a merchant for approval for financing and content generation to support the marketing event and determining whether to approve the merchant based on comparing information provided in the request to approval standards. The method may further include, responsive to approval of the merchant, receiving context information regarding content requested, and providing the content requested to the merchant based on the context information to support the marketing event.

In another example embodiment, an apparatus for facilitating merchant self-service assistance to financing and content support for a marketing event may be provided. The apparatus may include processing circuitry configured for receiving a request from a merchant for approval for financing and content generation to support the marketing event, determining whether to approve the merchant based on comparing information provided in the request to approval standards, responsive to approval of the merchant, receiving context information regarding content requested, and providing the content requested to the merchant based on the context information to support the marketing event.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 3 illustrates a request page that may be used to request self-service support for a marketing event in accordance with an example embodiment;

FIG. 4 illustrates a questionnaire that may be used to obtain context information for self-service support for the marketing event in accordance with an example embodiment.

DETAILED DESCRIPTION

Figure 1:
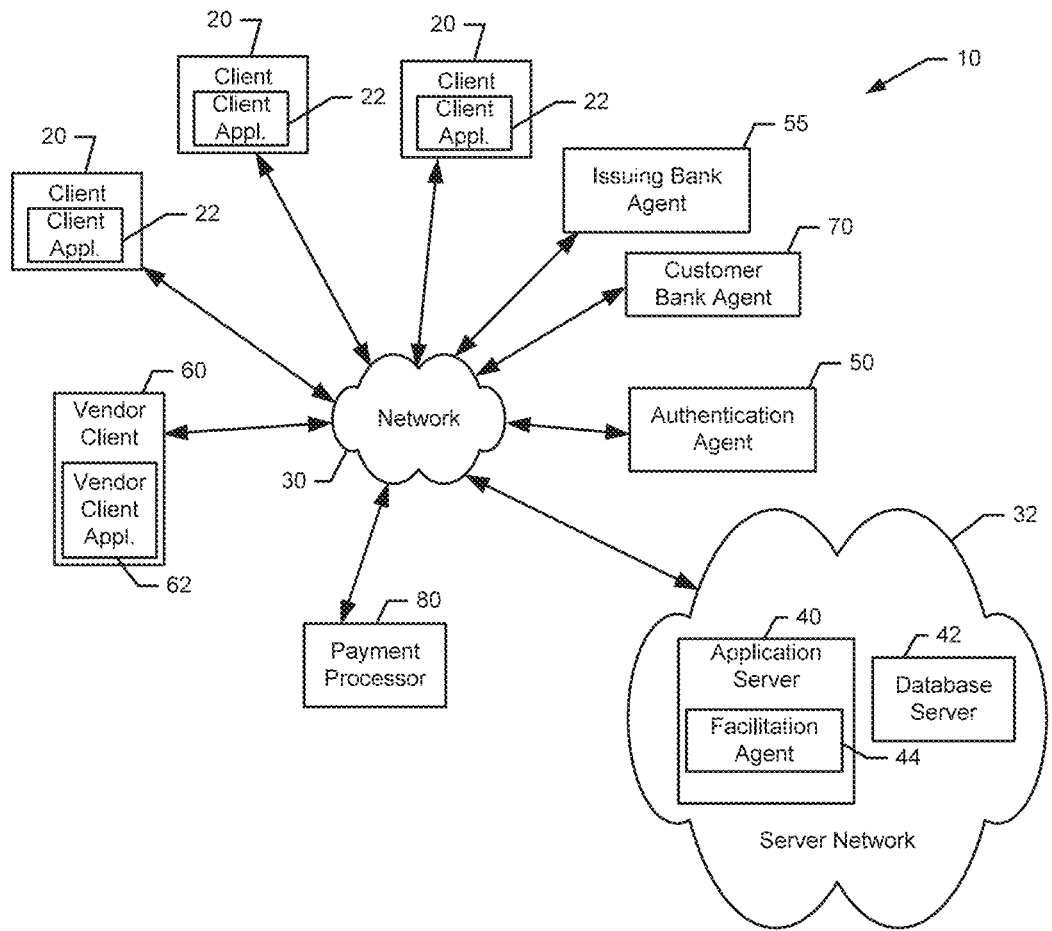
FIG. 1 illustrates a functional block diagram of a system for providing a selective financing and payment platform according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. Additionally, when the term "data" is used, it should be appreciated that the data may in some cases include simply data or a particular type of data generated based on operation of algorithms and computational services, or, in some cases, the data may actually provide computations, results, algorithms and/or the like that are provided as services.

As used in herein, the term "module" is intended to include a computer-related entity, such as but not limited to hardware, firmware, or a combination of hardware and software (i.e., hardware being configured in a particular way by software being executed thereon). For example, a module may be, but is not limited to being, a process running on a processor, a processor (or processors), an object, an executable, a thread of execution, and/or a computer. By way of example, both an application running on a computing device and/or the computing device can be a module. One or more modules can reside within a process and/or thread of execution and a module may be localized on one computer and/or distributed between two or more computers. In addition, these components can execute from various computer readable media having various data structures stored thereon. The modules may communicate by way of local and/or remote processes such as in accordance with a signal having one or more data packets, such as data from one module interacting with another module in a local system, distributed system, and/or across a network such as the Internet with other systems by way of the signal. Each respective module may perform one or more functions that will be described in greater detail herein. However, it should be appreciated that although this example is described in terms of separate modules corresponding to various functions performed, some examples may not necessarily utilize modular architectures for employment of the respective different functions. Thus, for example, code may be shared between different modules, or the processing circuitry itself may be configured to perform all of the functions described as being associated with the modules described herein. Furthermore, in the context of this disclosure, the term "module" should not be understood as a nonce word to identify any generic means for performing functionalities of the respective modules. Instead, the term "module" should be understood to be a modular component that is specifically configured in, or can be operably coupled to, the processing circuitry to modify the behavior and/or capability of the processing circuitry based on the hardware and/or software that is added to or otherwise operably coupled to the processing circuitry to configure the processing circuitry accordingly.

Some example embodiments described herein provide for a data processing platform that can be instantiated at an apparatus comprising configurable processing circuitry. The processing circuitry may be configured to execute various processing functions on financial data using the techniques described herein. The data processing platform may, for example, be configured to provide an information exchange via which multiple independent or even proprietary platforms may be connected to each other. As such, the data processing platform may be embodied as a selective financing and payment platform (i.e., SFP platform) that connects customers and merchants (or vendors) to banks, payment services, and a transaction facilitator within the financial industry. By enabling data between the players on or members of the platform to be shared, and by further providing customers with tools for using the platform to manage individual transactions before, during and also sometimes after the transactions occur, customers may have increased flexibility for managing their funds in a way that prevents over-extension, while still maximizing their access to the goods and services they desire or need at any given time. Moreover, the platform may be employed under the management of the facilitator to control the usage of data on mutually agreeable terms for all participants who access the platform. Accordingly, a commercial framework can be provided by a technical platform designed to connect customers with access to financial support to effect transactions in real time with added flexibility to determine terms upon which each transaction will be executed with participating merchants. The technical platform described herein, however, further streamlines providing merchants who wish (or may wish) to participate as a member of the ecosystem created by example embodiments with tools that enable the merchants to leverage the financing possibilities that can be accessed by customers to their advantage. For example, instead of merely having a passive platform that enables merchants who desire to become members of the ecosystem to become members and take payments within the system, example embodiments will provide a technical means by which to give the merchants tools to make their own offers, sales or other marketing content to leverage the financing services accessible via the platform and drive sales in a way that is relatively seamless and easy. The creation of a technical platform for proactively evaluating merchants and, in some cases, the products offered or customers being approached, to thereafter give different levels of access to tools for generating content associated with financing services, and the services themselves, may be provided. Thus, for example, the merchants can qualify for certain levels of service, and get corresponding tools to enable the merchants to create sales, offers or other marketing materials themselves without further interaction with personnel associated with the facilitator. This self-service paradigm may allow the merchants to more easily access the customers they seek to engage with, and may also do so without requiring personnel to be dedicated to interacting with the merchants. Thus, more merchants can engage more customers to drive more sales, using less resources at the facilitator's platform, but while using resources and services provided by the facilitator's platform. Not only may example embodiments expand the ecosystem in which customers (many of whom may wish to utilize the platform to make purchases via buy now, pay later (BNPL) financing) can engage in transactions with merchants, but the engagement can be enhanced through technical means to more efficient affect, and at far lower cost without any sacrifice in service. This may drive more sales for participating merchants, and more satisfaction for the customers. As such, one platform, managed by the facilitator, may be provided for the interaction of multiple parties to enable usage of the platform to provide a flexible and yet cohesive experience for customers that maximizes responsible access to financial freedom and satisfaction.

Example embodiments not only provide the SFP platform, but also provide various enabling technologies that may facilitate operation of the SFP platform itself or of modules that may interact with the SFP platform for processing transactions amongst parties that engage with, or are members, of the ecosystem created by the SFP platform. Example embodiments therefore provide the SFP platform, supporting structures and technologies for its use, and also for processing transactions between members (e.g., lenders, customers and merchants). Moreover, as noted above, the SFP platform further takes an active role in identifying a level at which various merchants are eligible to participate in the SFP platform, and engages with such merchants in order to facilitate their easy access to participating in the ecosystem and to the customers who are also members of the ecosystem. In other words, example embodiments may also provide for enhancement of functionalities associated with the environment that is created by the SFP platform, particularly in relation to the enabling of merchants that become members of or participants in the ecosystem of the SFP platform to engage with customers via sales, offers or other marketing efforts (all referred to herein generally as examples of marketing events) for which tools to facilitate generation of content associated with the sales, offers or other marketing efforts are provided via the SFP platform. The SFP platform may therefore provide a technical mechanism by which to enhance commerce in a responsible way that is both empathetic and empowering to customers and merchants.

An example embodiment will now be described in reference to FIG. 1, which illustrates an example system in which an embodiment of the present invention may be employed. As shown in FIG. 1, a system comprising an SFP platform 10 according to an example embodiment may include one or more client devices (e.g., clients 20). Notably, although FIG. 1 illustrates three clients 20, it should be appreciated that a single client or many more clients 20 may be included in some embodiments and thus, the three clients 20 of FIG. 1 are simply used to illustrate a potential for a multiplicity of clients 20 and the number of clients 20 is in no way limiting to other example embodiments. In this regard, example embodiments are scalable to inclusion of any number of clients 20 being tied into the SFP platform 10. Furthermore, in some cases, some embodiments may be practiced on a single client without any connection to the SFP platform 10.

The clients 20 may, in some cases, each be associated with a single individual or customer. However, in some embodiments, one or more of the clients 20 may be associated with an organization (e.g., a company) or group of individuals (e.g., a family unit). In general, the clients 20 may be referred to as members of the environment or community associated with the SFP platform 10.

Each one of the clients 20 may include one or more instances of a communication device such as, for example, a computing device (e.g., a computer, a server, a network access terminal, a personal digital assistant (PDA), radio equipment, cellular phone, smart phone, or the like) capable of communication with a network 30. As such, for example, each one of the clients 20 may include (or otherwise have access to) memory for storing instructions or applications for the performance of various functions and a corresponding processor for executing stored instructions or applications. Each one of the clients 20 may also include software and/or corresponding hardware for enabling the performance of the respective functions of the clients 20 as described below. In an example embodiment, the clients 20 may include or be capable of executing a client application 22 configured to operate in accordance with an example embodiment of the present invention. In this regard, for example, the client application 22 may include software for enabling a respective one of the clients 20 to communicate with the network 30 for requesting and/or receiving information and/or services via the network 30 as described herein. The information or services receivable at the client applications 22 may include deliverable components (e.g., downloadable software to configure the clients 20, or information for consumption/processing at the clients 20). As such, for example, the client application 22 may include corresponding executable instructions for configuring the client 20 to provide corresponding functionalities for sharing, processing and/or utilizing financial data as described in greater detail below. In an example embodiment, the client application 22 may be employed to request financing to make a purchase with a merchant or vendor, as described in greater detail below.

The network 30 may be a data network, such as one or more instances of a local area network (LAN), a metropolitan area network (MAN), a wide area network (WAN) (e.g., the Internet), and/or the like, which may couple the clients 20 to devices such as processing elements (e.g., personal computers, server computers or the like) and/or databases. Communication between the network 30, the clients 20 and the devices or databases (e.g., servers) to which the clients 20 are coupled may be accomplished by either wireline or wireless communication mechanisms and corresponding communication protocols.

In an example embodiment, devices to which the clients 20 may be coupled via the network 30 may include one or more application servers (e.g., application server 40), and/or a database server 42, which together may form respective elements of a server network 32. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 and the database server 42 may each include hardware and/or software for configuring the application server 40 and the database server 42, respectively, to perform various functions. As such, for example, the application server 40 may include processing logic and memory enabling the application server 40 to access and/or execute stored computer readable instructions for performing various functions. In an example embodiment, one function that may be provided by the application server 40 may be the provision of access to information and/or services related to the SFP platform 10, and more particularly relating to facilitating transactions where the parties to the transaction are members of the ecosystem formed by the SFP platform 10. For example, the application server 40 may be configured to provide for storage of information descriptive of events or activities associated with the SFP platform 10 and the execution of a financial transaction on behalf of a customer in real time. In some cases, data and/or services may be exchanged amongst members, where specific needs or desires of the members are aligned with respect to playing their respective roles in connection with conducting a financial transaction using tools of the SFP platform 10 as described herein.

In some embodiments, for example, the application server 40 may therefore include an instance of a facilitation agent 44 comprising stored instructions for handling activities associated with practicing example embodiments as described herein. The facilitation agent 44 may be a technical device, component or module affiliated with the facilitator of the functioning of the SFP platform 10. Thus, the facilitation agent 44 may operate under control of the facilitator to be a technical means by which to carry out activities under direction of the facilitator or employees thereof. As such, in some embodiments, the clients 20 may access the SFP platform 10 services, and more particularly contact the facilitation agent 44 online and utilize the services provided thereby. However, it should be appreciated that in other embodiments, an application (e.g., the client application 22) enabling the clients 20 to interact with the facilitation agent 44 (or components thereof) may be provided from the application server 40 (e.g., via download over the network 30) to one or more of the clients 20 to enable recipient clients to instantiate an instance of the client application 22 for local operation such that the facilitation agent 44 may be a distributor of software enabling members or parties to participate in operation of the SFP platform 10. Alternatively, another distributor of the software may provide the client 20 with the client application 22, and the facilitation agent 44 may communicate with the client 20 (via the client application 22) after such download to execute functionalities described herein in a client/server relationship.

In an example embodiment, the client application 22 may therefore include application programming interfaces (APIs) and other web interfaces to enable the client 20 to conduct business or transactions via the SFP platform 10. The client application 22 may include a series of control consoles or web pages including a landing page, onboarding services, activity feed, account settings (e.g., user profile information), transaction management services, payment management services and the like in cooperation with a service application that may be executed at the facilitation agent 44. Thus, for example, the client application 22 may enable the customer to review monthly statements, request a loan, change settings associated with parameters or terms of the loan, access or adjust information associated with the customer account, or receive help or other information. Budgeting tools and other useful information and other useful tools for managing the finances of the customer may also be available via the client application 22 in some cases.

In an example embodiment, the application server 40 may include or have access to memory (e.g., internal memory or the database server 42) for storing instructions or applications for the performance of various functions and a corresponding processor for executing stored instructions or applications. For example, the memory may store an instance of the facilitation agent 44 configured to operate in accordance with an example embodiment of the present invention. In this regard, for example, the facilitation agent 44 may include software for enabling the application server 40 to communicate with the network 30 and/or the clients 20 for the provision and/or receipt of information associated with performing activities as described herein. Moreover, in some embodiments, the application server 40 may include or otherwise be in communication with an access terminal (e.g., a computer including a user interface) via which individual operators or managers of the entity associated with the facilitation agent may interact with, configure or otherwise maintain the SFP platform 10 and/or the facilitation agent 44.

As such, the environment of FIG. 1 illustrates an example in which provision of content and information associated with the financial industry (e.g., including at least some data provided to/from customers and/or vendors in real-time) may be accomplished by a particular entity (namely the facilitation agent 44 residing at the application server 40). Thus, the facilitation agent 44 may be configured to handle provision of content and information associated with tasks that are associated only with the SFP platform 10. Access to the facilitation agent 44 may therefore be secured as appropriate for the individuals or organizations involved and credentials of individuals or organizations attempting to utilize the tools provided herein may be managed by digital rights management services or other authentication and security services or protocols that are outside the scope of this disclosure.

The SFP platform 10 may also operate in cooperation with a bank authentication agent 50, an issuing bank agent 55, a vendor client 60, a customer bank agent 70, and a payment processor 80. The facilitation agent 44 may be configured to interact with, or otherwise facilitate interactions between, each of the bank authentication agent 50, the issuing bank agent 55, the vendor client 60, the customer bank agent 70, and the payment processor 80 in order to carry out example embodiments as described herein. Thus, each of the bank authentication agent 50, the issuing bank agent 55, the vendor client 60, the customer bank agent 70, and the payment processor 80 should be understood to be a computer, server, smart phone, or other technical component or module associated with a respective party (e.g., an authenticating bank, issuing bank, a vendor, a customer bank, and a payment service, respectively) that is capable of communication with other parties via the network 30, and under control of or responsive to facilitating communication by the facilitation agent 44.

The vendor client 60 may be similar to the client 20 described above, in some cases, except that the vendor client 60 may be associated with a merchant or vendor instead of a customer. The vendor client 60 may therefore also include a downloadable client application (e.g., vendor client application 62) similar to the client application 22 described above. However, the function of the vendor client application 62 may further interface with the facilitation agent 44 as described in greater detail below in order to handle onboarding of the merchant into the ecosystem of the SFP platform 10.

The issuing bank may be a bank or other financial services provider. The issuing bank may have a persistent relationship with the entity associated with the facilitation agent 44 (e.g., the facilitator), but generally need not have any persistent or pre-existing relationship with the customer or the customer bank. The issuing bank may be contracted with or otherwise have a pre-existing relationship with the facilitation agent 44 (and entity associated therewith) that enables the facilitation agent 44 to facilitate transactions on behalf of the customer when certain conditions (agreed upon in advance by the entity associated with the facilitation agent 44 and the issuing bank) are met associated with a transaction undertaken (or attempted) by the customer via the client 20 and client application 22. For example, the issuing bank may be the issuer of credit to the customer on behalf of the facilitation agent 44 and be responsible for directly paying the merchants and vendors during a transaction initiated by the customer via the operation of the SFP platform 10.

The bank authenticator may be an agent or financial service provider capable of granting the facilitation agent 44 access to the customer bank to view account balances and credentials. The balances and credentials may be used or relied upon to pull or push funds from or to the customer bank using the payment processor 80. Thus, for example, the bank authenticator may utilize its own software, application programming interfaces (APIs) or the like that define an infrastructure or intermediary platform to connect a customer's bank account with the facilitation agent 44.

The customer bank may be a bank at which the customer (i.e., associated with one of the clients 20) deposits money in a bank account such as a savings account or a checking account. In an example embodiment, the customer may apply via the facilitation agent 44 to enroll as a member of the SFP platform 10 and enable the customer to make purchases via transactions arranged in association with the facilitation agent 44 using, for example, online payment processing, a virtual card, a physical credit or debit card, or other payment method where the facilitator arranges for the issuing bank to issue a loan (e.g., a BNPL loan or conventional loan) to the customer and advances funds to the merchant associated with the vendor client 60 on behalf of the customer. During application, subscription or registration for the SFP platform 10, the customer may be prompted (via the client 20 and client application 22) by the facilitation agent 44 to provide account details identifying the savings account or checking account (i.e., a customer account) at the customer bank. The customer may, by registering or subscribing, further authorize the facilitation agent 44 to conduct specific activities related to the customer account when corresponding conditions are met, which may be facilitated by one of or a combination of the bank authenticator and the issuing bank as described above. The activities may include checking account status (i.e., checking a current balance of funds deposited in the customer account) and/or authorizing withdrawal of funds from the customer account by the payment processor 80 in order to settle a transaction or make payments to the facilitation agent 44. Credit checks or other activities enabling the customer to be approved for issuance of the virtual card may then be accomplished by the facilitation agent 44.

The payment processor 80 may be an agent or service that facilitates the acceptance and/or sending of payments between parties online. Thus, for example, the payment processor 80 may utilize its own software, application programming interfaces (APIs) or the like that define an infrastructure or payment platform to connect businesses or companies to manage their businesses or transactions online. Payments may be provided to the merchant or vendor on behalf of the customer when making a purchase, and the corresponding amount of the purchase may be converted into a loan (e.g., a BNPL loan or other loan) for the customer. Payments may also or alternatively be made by the customer to service the loan via the payment processor 80.

The customer bank agent 70 may change for each respective one of the clients 20 (and therefore for each respective customer). Similarly, the vendor client 60 may change for each respective transaction since different vendors may be involved in different transactions involving the clients 20. In some examples, the bank authentication agent 50 and the payment processor 80 may remain the same entities across all transactions managed by the facilitation agent 44. However, the facilitation agent 44 could use different bank authentication agents in different geographic areas or jurisdictions, and the payment processor 80 may also change on the same bases. In some cases, the facilitation agent 44 may use different bank authentication agents 50 in order to ensure all customers' banks can be accommodated. For example, if the customer bank was not serviced by a first bank authentication agent, the facilitation agent 44 is configured to swap in a second bank authentication agent that would allow for servicing of the customer bank. Accordingly, the facilitation agent 44 is configured to swap each of the payment processors 80 and the bank authentication agents 50 under certain circumstances. For example, the bank authentication agent 50 may be swapped by the facilitation agent 44 if the bank authentication agent 50 is temporarily offline or if the bank authentication agent 50 did not support a customer bank.

As noted above, the SFP platform 10 may operate to enable the customer associated with a given one of the clients 20 to make a purchase in real time from a merchant or vendor associated with the vendor client 60 either online or in-store using payment method arranged by the facilitator for the customer. In some example embodiments, the client application 22 may be used in connection with setting up the account details that are then used as the basis for managing interactions between the parties shown in FIG. 1 under control of the facilitation agent 44. In this regard, for example, the client application 22 may be used to engage (e.g., via a website and corresponding APIs) with the facilitation agent 44 to set up an account with the facilitation agent 44 for services associated with the SFP platform 10. The facilitation agent 44 may prompt the client 20 to provide account details associated with the customer bank agent 70 and may provide terms and conditions (electronically or via mail or other communication means) that the customer may accept to establish a user profile and user account with the facilitation agent 44.

During establishment of the user account, the customer may provide an identification of the customer bank associated with the customer bank agent 70, and may also provide details for the savings or checking account that the customer maintains at the customer bank. The customer may also authorize the facilitation agent 44 to make real time (or anytime) checks on account status (e.g., account balance) or to make periodic routine checks of the same. Thus, for example, for each transaction, the facilitation agent 44 may be enabled to check the account balance of the customer. Alternatively or additionally, the facilitation agent 44 may make routine checks or snapshot looks at the account balance. For example, a check may be made every day at a certain time, every two or three days, or at other standard or random intervals. The account status of the customer bank may be used by the facilitation agent 44 in facilitating payment transactions, and determining credit limits or making credit extension decisions. In some cases, a similar process may also be followed for merchants or vendors to facilitate taking payments from or providing payments to merchants or vendors.

Regardless of how the transactions are initiated, the SFP platform 10 of FIG. 1 may be used before, during and after the time of the transaction in order to enable the facilitation agent 44 to set up the user account for a customer, make determinations necessary to initiate the transactions in real time responsive to initiation of the transaction, and facilitate enabling the customer and to determine the treatment of transactions thereafter. Each of these activities may have its own respective timing and communications that are facilitated by the facilitation agent 44. However, example embodiments may further effectively and efficiently manage the onboarding of merchants into the ecosystem as well. Thus, more merchants may become part of the ecosystem thereby enriching the experience for customers by enhancing the number of ecosystem participants and therefore the number of opportunities for advantageous engagement between members of the ecosystem. Notably, in some embodiments, support for transactions may not be limited only to merchants that are members of the ecosystem. However, by becoming an integrated member of the ecosystem, merchants may be enabled to offer more services, enhancements, offers, and enticements to customers. Thus, integrated merchants may be empowered to attract more customers through engagement enabled by the SFP platform 10 (e.g., via enhanced tool kits, information about customers, or access) than those who are not integrated. Thus, again, enriching the ecosystem provides improved outcomes for all members or participants in the ecosystem. Various examples of structures associated with an apparatus at which the facilitation agent 44 of an example embodiment may be instantiated will be described in reference to FIG. 2.

Figure 2:
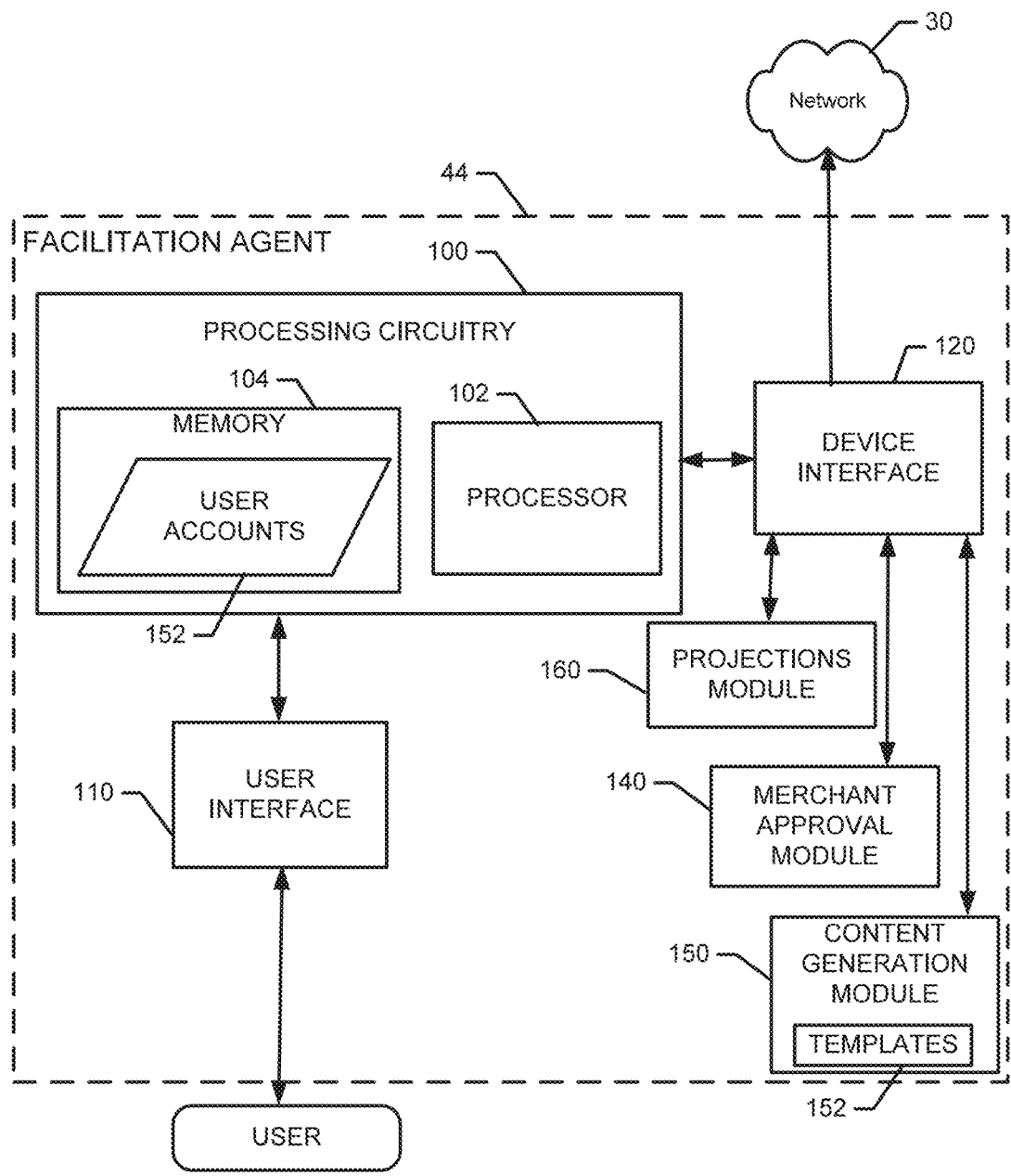
FIG. 2 illustrates a functional block diagram of an apparatus for defining a facilitation agent according to an example embodiment.

FIG. 2 shows certain elements of an apparatus for provision of the facilitation agent 44 or other processing circuitry according to an example embodiment. The apparatus of FIG. 2 may be employed, for example, as the facilitation agent 44 itself operating at, for example, a network device, server, proxy, or the like (e.g., the application server 40 of FIG. 1)). Alternatively, embodiments may be employed on a combination of devices (e.g., in distributed fashion on a device (e.g., a computer) or a variety of other devices/computers that are networked together). Accordingly, some embodiments of the present invention may be embodied wholly at a single device (e.g., the application server 40) or by devices in a client/server relationship (e.g., the application server 40 and one or more clients 20/vendor clients 60). Thus, although FIG. 2 illustrates the facilitation agent 44 as including the components shown, it should be appreciated that some of the components may be distributed and not centrally located in some cases. Furthermore, it should be noted that the devices or elements described below may not be mandatory and thus some may be omitted or replaced with others in certain embodiments.

Referring now to FIG. 2, an apparatus for provision of tools, services and/or the like for facilitating an exchange for information and services associated therewith in the financial industry is provided. The apparatus may be an embodiment of the facilitation agent 44 or a device of the SFP platform 10 hosting the facilitation agent 44. As such, configuration of the apparatus as described herein may transform the apparatus into the facilitation agent 44. In an example embodiment, the apparatus may include or otherwise be in communication with processing circuitry 100 that is configured to perform data processing, application execution and other processing and management services according to an example embodiment of the present invention. In one embodiment, the processing circuitry 100 may include a storage device (e.g., memory 104) and a processor 102 that may be in communication with or otherwise control a user interface 110 and a device interface 120. As such, the processing circuitry 100 may be embodied as a circuit chip (e.g., an integrated circuit chip) configured (e.g., with hardware, software or a combination of hardware and software) to perform operations described herein. However, in some embodiments, the processing circuitry 100 may be embodied as a portion of a server, computer, laptop, workstation or even one of various mobile computing devices. In situations where the processing circuitry 100 is embodied as a server or at a remotely located computing device, the user interface 110 may be disposed at another device (e.g., at a computer terminal) that may be in communication with the processing circuitry 110 via the device interface 120 and/or a network (e.g., network 30).

The user interface 110 may be in communication with the processing circuitry 100 to receive an indication of a user input at the user interface 110 and/or to provide an audible, visual, mechanical or other output to the user. As such, the user interface 110 may include, for example, a keyboard, a mouse, a joystick, a display, a touch screen, a microphone, a speaker, augmented/virtual reality device, or other input/output mechanisms. In embodiments where the apparatus is embodied at a server or other network entity, the user interface 110 may be limited or even eliminated in some cases. Alternatively, as indicated above, the user interface 110 may be remotely located. For example, in some cases, the user interface 110 may be disposed at a remote device (e.g., the client 20/vendor client 60) and may therefore be operable through communication via the network 30.

The device interface 120 may include one or more interface mechanisms for enabling communication with other devices and/or networks. In some cases, the device interface 120 may be any means such as a device or circuitry embodied in either hardware, software, or a combination of hardware and software that is configured to receive and/or transmit data from/to a network (e.g., network 30) and/or any other device or module in communication with the processing circuitry 100. In this regard, the device interface 120 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 120 communicates with a network, the network 30 may be any of various examples of wireless or wired communication networks such as, for example, data networks like a Local Area Network (LAN), a Metropolitan Area Network (MAN), and/or a Wide Area Network (WAN), such as the Internet, as described above.

In an example embodiment, the memory 104 may include one or more non-transitory storage or memory devices such as, for example, volatile and/or non-volatile memory that may be either fixed or removable. The memory 104 may be configured to store information, data, applications, instructions or the like for enabling the apparatus to carry out various functions in accordance with example embodiments of the present invention. For example, the memory 104 could be configured to buffer input data for processing by the processor 102. Additionally or alternatively, the memory 104 could be configured to store instructions for execution by the processor 102. As yet another alternative, the memory 104 may include one of a plurality of databases (e.g., database server 42) that may store a variety of files, contents or data sets. Among the contents of the memory 104, applications (e.g., a service application configured to interface with the client application 22/vendor client application 62) may be stored for execution by the processor 102 in order to carry out the functionality associated with each respective application.

The processor 102 may be embodied in a number of different ways. For example, the processor 102 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 102 may be configured to execute instructions stored in the memory 104 or otherwise accessible to the processor 102. As such, whether configured by hardware or software methods, or by a combination thereof, the processor 102 may represent an entity (e.g., physically embodied in circuitry) capable of performing operations according to embodiments of the present invention while configured accordingly. Thus, for example, when the processor 102 is embodied as an ASIC, FPGA or the like, the processor 102 may be specifically configured hardware for conducting the operations described herein. Alternatively, as another example, when the processor 102 is embodied as an executor of software instructions, the instructions may specifically configure the processor 102 to perform the operations described herein.

In an example embodiment, the processor 102 (or the processing circuitry 100) may be embodied as, include or otherwise control the facilitation agent 44, which may be any means such as a device or circuitry operating in accordance with software or otherwise embodied in hardware or a combination of hardware and software (e.g., processor 102 operating under software control, the processor 102 embodied as an ASIC or FPGA specifically configured to perform the operations described herein, or a combination thereof) thereby configuring the device or circuitry to perform the corresponding functions of the facilitation agent 44 as described below.

The facilitation agent 44 may be configured to include tools to facilitate the creation of customer, merchant or user accounts (and a corresponding profile for each), the provision of tools to enable merchants to define marketing programs, incentives, sales, etc., the means by which customers can engage merchants to pay for services (e.g., financed by a loan such as a BNPL loan), and the coordination of communication and fund transfers to support the operations of the SFP platform 10 as described herein. The tools may be provided in the form of various modules that may be instantiated by configuration of the processing circuitry 100. Many of those tools may relate to aspects that are outside the scope of this disclosure, and therefore will not be discussed specifically herein. Instead, FIG. 2 illustrates some examples of modules that may be included in the facilitation agent 44 and that may be individually configured to perform one or more of the individual tasks or functions generally attributable to the facilitation agent 44 according to an example embodiment and relevant to the focus of this disclosure. However, the facilitation agent 44 need not necessarily be modular. In cases where the facilitation agent 44 employs modules, the modules may, for example, be configured to perform the tasks and functions described herein. In some embodiments, the facilitation agent 44 and/or any modules comprising the facilitation agent 44 may be any means such as a device or circuitry operating in accordance with software or otherwise embodied in hardware or a combination of hardware and software (e.g., processor 102 operating under software control, the processor 102 embodied as an ASIC or FPGA specifically configured to perform the operations described herein, or a combination thereof) thereby configuring the device or circuitry to perform the corresponding functions of the facilitation agent 44 and/or any modules thereof, as described herein.

As shown in FIG. 2, the facilitation agent 44 may include a merchant approval module 140, a content generation module 150 and a projections module 160. The merchant approval module 140 may be configured to employ various tools and strategies for searching the internet or other publicly available networks, and specifically for searching individual merchant websites to unobtrusively gather information about the merchants associated with each respective one of the merchant web sites associated with a merchant making a request of the facilitation agent 44. In some example embodiments, the merchant approval module 140 may employ a search engine or similar feature that engages responsive to receipt of a request from a merchant to join the ecosystem. Even if a merchant is already a part of the ecosystem the merchant approval module 140 may be configured to field requests from the facilitation agent 44 for a merchant requesting support with respect to a marketing event (e.g., sale or promotion, etc.) using self-service support provided by the facilitation agent 44.

The searching, or other information gathering, may be performed to determine the nature of the business of the merchant making the request, and determine whether to approve such request. However, in other cases, all (or some) information needed to decide whether to approve a merchant making a request may be received responsive to specific requests or inquiries made by the merchant approval module 140. Thus, in any case, when a merchant sends a request to receive self-service support tools from the facilitation agent 44 to support a marketing event (or other activity), the merchant approval module 140 performs any needed risk assessment and/or information gathering steps needed to evaluate the request. Information used to evaluate the request may include, but is not limited to, web content associated with the requesting merchant's website, social media information, reputation information, financial information, sales volume (and products for which such volume applies), etc. The web content may include information gathered at the requesting merchant's web site and/or reputation information may be gathered on social media, or other media outlets (e.g., news, magazine, or other reporting services). Thus, for example, information about the requesting merchant may be gathered from the merchant's website, articles, evaluations, customer rankings, social media activities and/or the like associated with the requesting merchant. The information extracted from social media may include number of followers, subscribers, or likes, or may include an assessment of the level of following, activity or engagement that the merchant has with customers or industry participants.

In an example embodiment, the merchant approval module 140 may be configured to perform data gathering in a structured and strategic way organized around specific products, industries or other hierarchical divisions. Certain products, industries or the like may be similar enough to have general known information or data that applies industry wide, or for a set of product types. Such information may be imputed to the requesting merchant based on the understanding of which products the merchant sells (or plans to sell via the marketing event), and therefore information on sales volumes, sales margins (even relative to sale terms planned to be offered) or other information regarding the likely outcome of impact of the sale may be determined (and may be communicated to the projection module 160 as described below). Otherwise, in some embodiments, the merchant approval module 140 may include APIs or control consoles presented to the requesting merchant (e.g., on a computer terminal or smart phone at which the vendor client application 62 is executed) to request information such as product offerings, product price, average sale price, sales volume, etc., which may be applicable to the marketing event for which content and self-service assistance is requested. In some cases, the information requested may be requested via the interface screens (e.g., control consoles) an example of which is shown in FIG. 3, which will be described in greater detail below.

In this regard, as shown in FIG. 3, a request page 300 (or pages) may be provided for generation at the vendor client 60 (via the vendor client application 62) by communication from the facilitation agent 44. The request page 300 may include a number of questions or information gathering entry devices that are used to obtain information from the requesting merchant that will be needed by the merchant approval module 140 to evaluate a request. For example, a response element 310 may be provided via which the merchant is enabled to inform the facilitation agent 44 as to the type of event that is the basis for the request. In some cases, the merchant can type the response to the question into the response element 310. However, in other cases, a drop down menu may provide individual different acceptable responses (e.g., response 312 and response 314) that can be evaluated. Another response element 320 may be provided to receive date range information to identify the date or dates that the event will run. In some cases, where the merchant wishes to provide a specific type of financing option (e.g., a BNPL loan, or a fixed interest loan), the request page 300 may include a financing type selector 330, which may be a drop down menu, free text entry, or other means by which to specify the type of financing vehicle for which the merchant is requesting assistance.

In an example embodiment, the merchant approval module 140 may also request information about the financial details proposed by the requesting merchant for the marketing event. In some cases, the requesting merchant may pay (e.g., the facilitator) to subsidize financing options to be offered, or otherwise pay for services associated with ensuring acceptance of more customers (or even competing for customers). In such cases, the request page 300 (or another request page) may provide a bid selector 340 in the form of a slider or other input mechanism for the requesting merchant to make a bid that can be used by the merchant approval module 140 to determine (e.g., based on risk assessments, reputation ratings, or other volume or sales information along with the bid) whether to approve the merchant for financing, and self-service assistance for the marketing event. In some cases, the request page 300 may also or alternatively solicit input from the requesting merchant regarding various pricing constraints that the merchant may wish to apply to the marketing event. For example, the merchant may be enabled to select an interest rate via an interest rate selector 350 (e.g., slider bar or other entry mechanism) and may be enabled to select a maximum and/or minimum financing amount for customers in accordance with the marketing event via selectors 352 and 354, respectively. In some cases, the specific products or stock keeping units (SKUs) that are featured in the event may also be provided via a corresponding selector 360 on the request page 300.

Once all pertinent information from the request page 300 (or pages), or from any other sources, has been gathered by the merchant approval module 140, the merchant approval module 140 may determine whether to accept the request, or approve the requesting merchant. The acceptance or approval may be made on the basis of comparing the received information to various criteria stored by the merchant approval module 140. The criteria may be referred to as approval standards in some cases. In an example embodiment, the merchant approval module 140 may include a model or machine learning module that defines acceptance criteria or approval standards in a fixed way (e.g., for the model) or in a dynamic way (e.g., for the machine learning module). In some embodiments, the approval standards may include various sequentially set thresholds that when met, translate to a corresponding acceptance level for the requesting merchant based on which thresholds were exceeded. Each acceptance level may correspond to a credit limit or amount of total extendable credit associated with the marketing event, which the merchant will be made aware of in case the acceptance level requires modification of the marketing event (e.g., to limit to a given number of responders, or to the total amount of extendable credit). Each acceptance level may also correspond to a respective amount of financial and technical assistance that will be granted to the merchant with respect to the marketing event.

Once the requesting merchant is approved, the merchant may then interact with the content generation module 150 in order to receive content in support of the marketing event. The approved merchant is therefore not only approved to be able to use the facilitator as a resource by which customers may obtain special financing for the marketing event, but the facilitation agent 44 may further provide content to support the marketing event in a self-service environment, where the content provided is specific to context information the merchant provides. The context information may be descriptive of the form or type of content requested, and the content requested may then be automatically supplied in accordance with the context information. The content generation module 150 may generate an event questionnaire 400, for display by the vendor client application 62, to obtain the context information that may be used to define tools that are provided to the approved merchant. The content generation module 150 may therefore effectively provide a tool box or tool kit, or help identify the specific tool box or tool kit that should be provided to the approved merchant, for generation of content in support of the marketing event that is specific to the context information provided by the accepted merchant.

In an example embodiment, the content generation module 150 may itself act as the tool kit responsive to inputs received via the event questionnaire 400. However, in some cases, a software application may actually be communicated to the vendor client 60 for execution thereat, and such software application may, at the vendor client 60, present the event questionnaire 400 or other tools for use by the accepted merchant to define content for the marketing event.

In some cases, the event questionnaire 400 may include a series of questions and/or entry consoles via which the context information specific to the content that may be used by the approved merchant (e.g., on the merchant's website) can be obtained. In an example embodiment, a series of questions with freeform entry consoles, or with drop down menus, or other menu selections or data entry mechanisms may be employed to receive the context information from the approved merchant. Although the questions may vary, and the context information requested and received may also vary, FIG. 4 shows one example of the types of information that may be requested, and some examples of means by which to receive responses to queries posed to obtain the context information. In this regard, as shown in FIG. 4, the content generation module 150 may solicit information on the location and form of notifications, advertisements or other descriptors that the approved merchant will use to inform customers of the marketing event. Thus, for example, a location selector 410 may be provided to pick a preferred location (or locations) for the appearance of the content associated with the marketing event. A formal selector 420 may also be provided to enable the approved merchant to pick the preferred format for the content associated with the marketing event. Branding element submission information 430 may also be provided to enable the approved merchant to enable the approved merchant to upload branding elements such as logos, etc. The approved merchant may also be able to inform the content generation module 150 of a tagline or other messaging that is specific to the marketing event, and that should be incorporated into the content associated with the marketing event.

In some cases, web architecture information 440 may also be provided so that content that can be plug and play (or close thereto) for the merchant's website, may be provided and properly formatted. As shown in FIG. 2, the content generation module 150 may store a number of templates 152, which may be modified according to the information provided via the event questionnaire 400. Each of the templates 152 may have been previously constructed in accordance with the various combinations of selectable options for preferred locations and formats for the content associated with the marketing event. The templates 152 may also have preformatted spaces into which branding elements or logos, or into which taglines or other materials submitted by the approved merchant may be added into the content associated with the marketing event provided to the approved merchant for display on selected pages of the merchant's website.

In some cases, instead of simply receiving content generated based on the templates 152, the approved merchant may provide contact information 450 to request that technical personnel of the facilitator reach out to the approved merchant to coordinate specific formatting or other details associated with generation of the content associated with the marketing event. Based on the information provided via the event questionnaire 400 or other similar information gathering pages or consoles, the content generation module 150 may generate content for integration into the merchant's web site to advertise or otherwise inform customers of the marketing event. Thus, except where the merchant specifically requests interpersonal contact, the merchant can seamlessly request approval for support from a financing and technical perspective to run a marketing event (e.g., a sale, promotion or the like) on short, and almost no notice. Thus, a sale could be supported from the ground up in as few as a couple of hours from conception.

Although not required, in some embodiments, the facilitation agent 44 may also include the projections module 160. The projections module 160 may employ machine learning to project the impact of the content provided to the approved merchant. In this regard, for example, the projections module 160 may include a trained model or network (e.g., a convolutional neural network (CNN)) that is trained on time series financial data showing impacts of marketing efforts on sales volume, etc. The model or network may be initially trained using data globally available, but will evolve over time through training specific to an industry, merchant or product line. Thus, for example, the model or network may continue to be updated until multiple models are available in connection with specific industries, merchants, or products types/SKUs. These updated models may get better and better over time at determining the impact (or projected impact) of sales or promotions on the sales volume, profits, etc., that may be experienced if terms approved by the merchant approval module 140, and the content provided by the content generation module 150 are employed. Accordingly, after the merchant has supplied a request, the merchant may use various selectors (e.g., including those described above in reference to FIGS. 3 and 4, or others tailored to use with the projections module 160) to define hypothetical scenarios and view the impact on volume sales for the various constraints or financial terms being considered (or having been accepted). This projection capability may assist merchants in defining bids described above, or in determining what financial terms and constraints to include in a request. Moreover, since the machine learning described above may improve performance over time, the longer the merchant is a member of the ecosystem, the better the projections may become.

Figure 5:
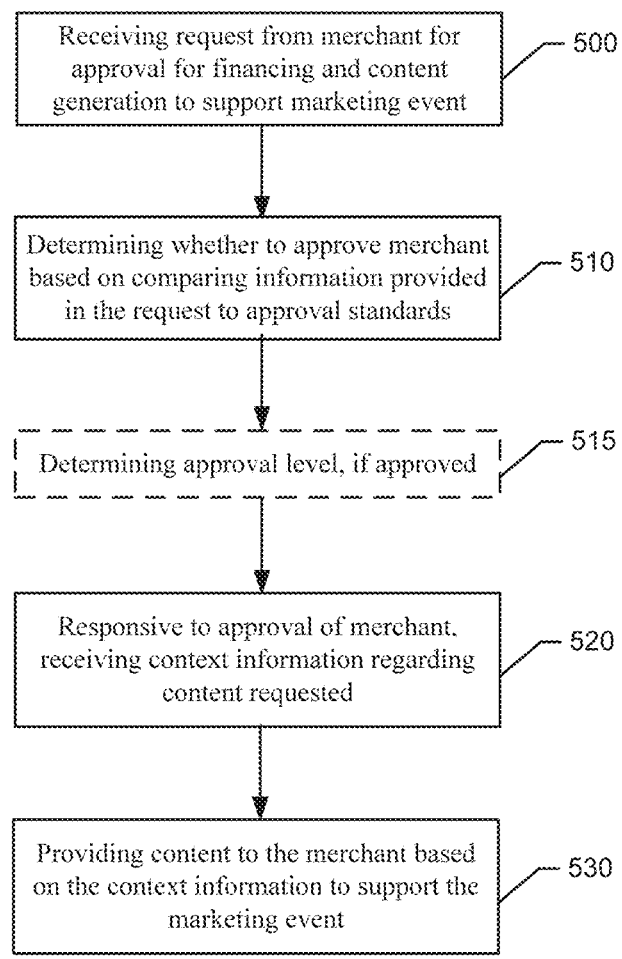
FIG. 5 illustrates a block diagram of a method for facilitating merchant self-service assistance to financing and content support for a marketing event in accordance with an example embodiment.

From a technical perspective, the SFP platform 10, and more particularly the facilitation agent 44, described above may be used to support some or all of the operations described above. As such, the apparatus described in FIG. 2 may be used to facilitate the implementation of several computer program and/or network communication based interactions. As an example, FIG. 5 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (e.g., client 20, vendor client 60, application server 40, and/or the like) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method of facilitating merchant self-service assistance to financing and content support for a marketing event is shown in FIG. 5. The method may include receiving a request from a merchant for approval for financing and content generation to support the marketing event at operation 500 and determining whether to approve the merchant based on comparing information provided in the request to approval standards at operation 510. The method may further include, responsive to approval of the merchant, receiving context information regarding content requested at operation 520, and providing the content requested to the merchant based on the context information to support the marketing event at operation 530. Although not required, an optional additional method of determining an approval level of the merchant may be accomplished at operation 515, if the merchant is approved.

In an example embodiment, an apparatus for performing the method of FIG. 5 above may comprise a processor (e.g., the processor 102) or processing circuitry configured to perform some or each of the operations (500-530) described above. The processor may, for example, be configured to perform the operations (500-530) by performing hardware implemented logical functions, executing stored instructions, or executing algorithms for performing each of the operations. In some embodiments, the processor or processing circuitry may be further configured for additional operations or optional modifications to operations 500 to 530.

In some embodiments, the method (and a corresponding apparatus or system configured to perform the operations of the method) may include (or be configured to perform) additional components/modules, optional operations, and/or the components/operations described above may be modified or augmented. Some examples of modifications, optional operations and augmentations are described below. It should be appreciated that the modifications, optional operations and augmentations may each be added alone, or they may be added cumulatively in any desirable combination. In this regard, for example, the approval level determined may correspond to one of a series of thresholds for which the request is approved. In an example embodiment, the request from the merchant may include a bid for targeted customers or for targeted product stock keeping units (SKUs). In some cases, the request from the merchant may include type information descriptive of the marketing event, and a date or dates for the marketing event. In an example embodiment, the request from the merchant may include financial constraints associated with customer financing support. In some cases, the request from the merchant may include information descriptive of a type of financing that is to be offered to customers via the marketing event. In an example embodiment, the approval of the merchant may include an acceptance of the request for the type of financing and the financial constraints. In some cases, providing the content may include providing content to be added to a website of the merchant based on a template, where the template includes a format selected by the merchant for informing customers about the marketing event and branding information or a tagline provided by the merchant. In an example embodiment, the method may further include providing a projection of sales impact of the marketing event.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An apparatus for facilitating merchant self-service assistance to financing and content support for a marketing event, the apparatus comprising processing circuitry configured to:
   receive a request from a merchant for approval for financing and content generation to support the marketing event, wherein the request includes financial constraints associated with customer financing support;
   determine whether to approve the merchant based on comparing information provided in the request to approval standards;
   responsive to approval of the merchant, send an event questionnaire to be displayed at a user device of the merchant, wherein the event questionnaire defines a series of entry consoles or drop down menus via which the approved merchant is able to enter context information regarding content requested to support the marketing event;
   receive context information via answers provided by the approved merchant to the event questionnaire, wherein the context information comprises web architecture information;
   generate a first portion of the content in a format supported by a web architecture of the merchant according to the web architecture information,
   identify, based on the received context information, a tool kit to enable the merchant to define a second portion of the content requested using the tool kit;
   provide the tool kit to the user device of the merchant to enable generation of the second portion of content requested to support the marketing event;
   employ a convolutional neural network trained on time series financial data to project a sales impact of the marketing event; and
   send the projected sales impact of the marketing event to be displayed at the user device of the merchant.

2. The apparatus of claim 1, wherein the processing circuitry is further configured to determine an approval level for the merchant responsive to the request being approved.

3. The apparatus of claim 2, wherein the approval level corresponds to one of a series of thresholds for which the request is approved.

4. The apparatus of claim 1, wherein the request from the merchant includes a bid for targeted customers or for targeted product stock keeping units (SKUs).

5. The apparatus of claim 1, wherein the request from the merchant includes type information descriptive of the marketing event, and a date or dates for the marketing event.

6. The apparatus of claim 1, wherein the request from the merchant includes information descriptive of a type of financing that is to be offered to customers via the marketing event.

7. The apparatus of claim 6, wherein the approval of the merchant comprises an acceptance of the request for the type of financing and the financial constraints.

8. The apparatus of claim 1, wherein generating the content comprises generating content to be added to a website of the merchant based on a template, the template including a format selected by the merchant for informing customers about the marketing event and branding information or a tagline provided by the merchant.

9. The apparatus of claim 1, wherein the processing circuitry is further configured to provide the projection of sales impact of the marketing event for sales volume and profit with respect to specific product types and product stock keeping units (SKUs).

10. A method of facilitating merchant self-service assistance to financing and content support for a marketing event, the method comprising:
- receiving a request from a merchant for approval for financing and content generation to support the marketing event, wherein the request includes financial constraints associated with customer financing support;
- determining whether to approve the merchant based on comparing information provided in the request to approval standards;
- responsive to approval of the merchant, sending an event questionnaire to be displayed at a user device of the merchant, wherein the event questionnaire defines a series of entry consoles or drop down menus via which the approved merchant is able to enter context information regarding content requested to support the marketing event;
- receiving context information via answers provided by the approved merchant to the event questionnaire, wherein the context information comprises web architecture information;
- generating a first portion of the content in a format supported by a web architecture of the merchant according to the web architecture information,
- identifying, based on the received context information, a tool kit to enable the merchant to define a second portion of the content requested using the tool kit;
- providing the tool kit to the user device of the merchant for to enable generation of the second portion of the content requested to support the marketing event;
- employing a convolutional neural network trained on time series financial data to project a sales impact of the marketing event; and
- sending the projected sales impact of the marketing event to be displayed at the user device of the merchant.

11. The method of claim 10, further comprising determining an approval level for the merchant responsive to the request being approved.

12. The method of claim 11, wherein the approval level corresponds to one of a series of thresholds for which the request is approved.

13. The method of claim 10, wherein the request from the merchant includes a bid for targeted customers or for targeted product stock keeping units (SKUs).

14. The method of claim 10, wherein the request from the merchant includes type information descriptive of the marketing event, and a date or dates for the marketing event.

15. The method of claim 10, wherein the request from the merchant includes information descriptive of a type of financing that is to be offered to customers via the marketing event.

16. The method of claim 15, wherein the approval of the merchant comprises an acceptance of the request for the type of financing and the financial constraints.

17. The method of claim 10, wherein generating the content comprises generating content to be added to a website of the merchant based on a template, the template including a format selected by the merchant for informing customers about the marketing event and branding information or a tagline provided by the merchant.

18. The method of claim 10, further comprising providing the projection of sales impact of the marketing event for sales volume and profit with respect to specific product types and product stock keeping units (SKUs).

* * * * *